Sept. 21, 1926. 1,600,644
J. E. PHILIPS
VALVE MOVEMENT
Filed June 9, 1925 3 Sheets-Sheet 2
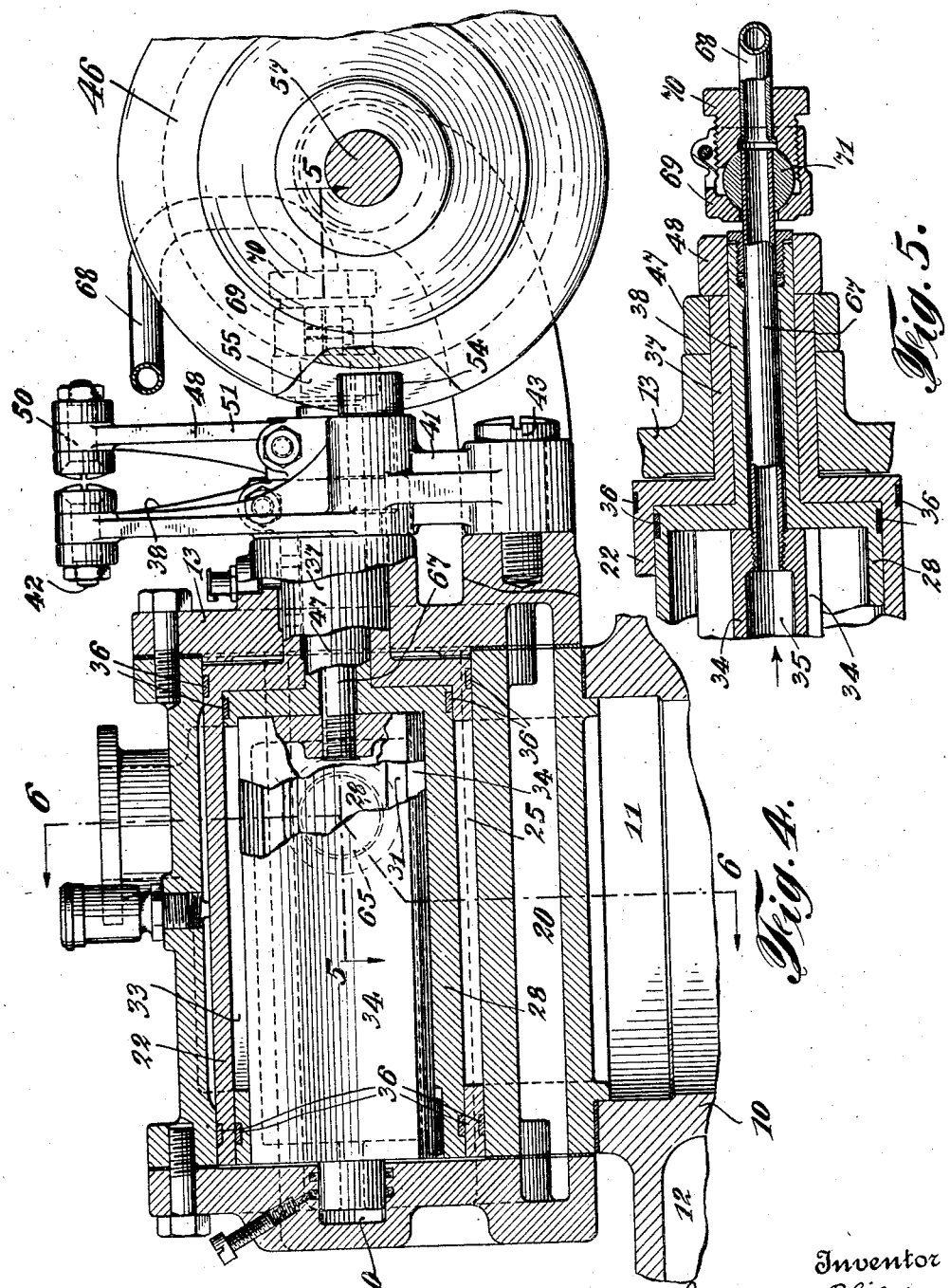

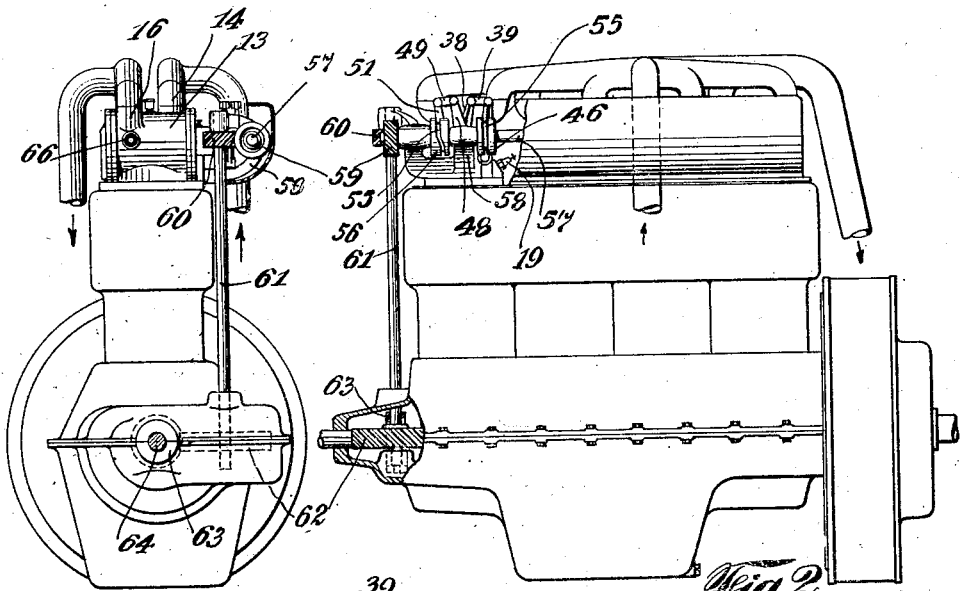

Sept. 21, 1926.
J. E. PHILIPS
VALVE MOVEMENT
Filed June 9, 1925
1,600,644
3 Sheets-Sheet 3
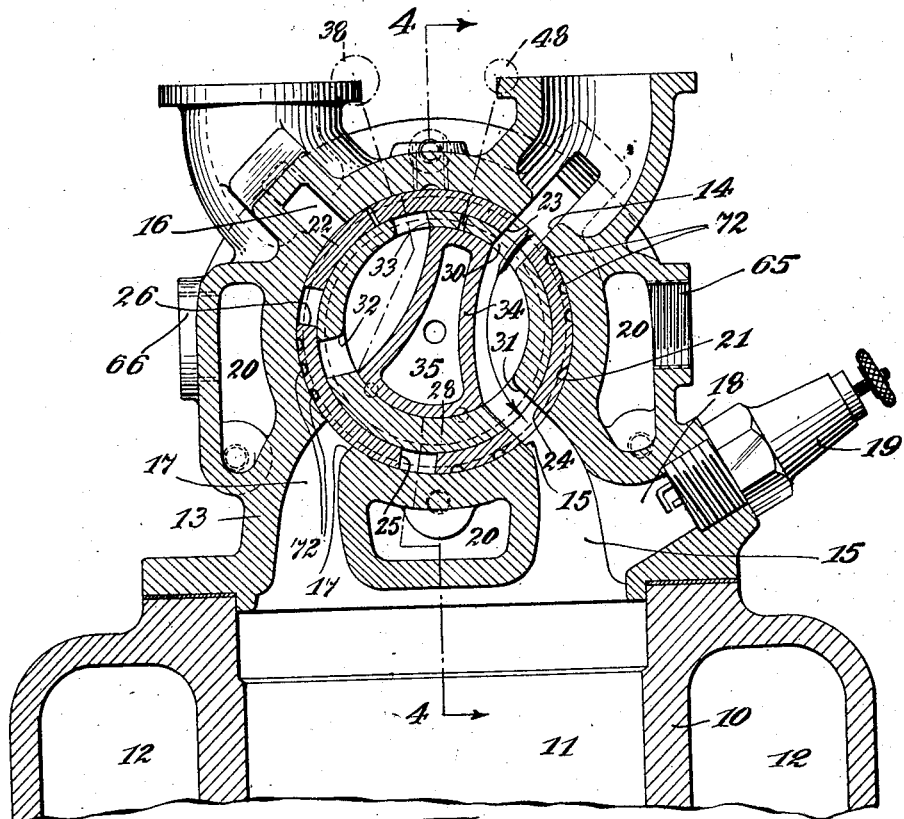
Fig. 6.
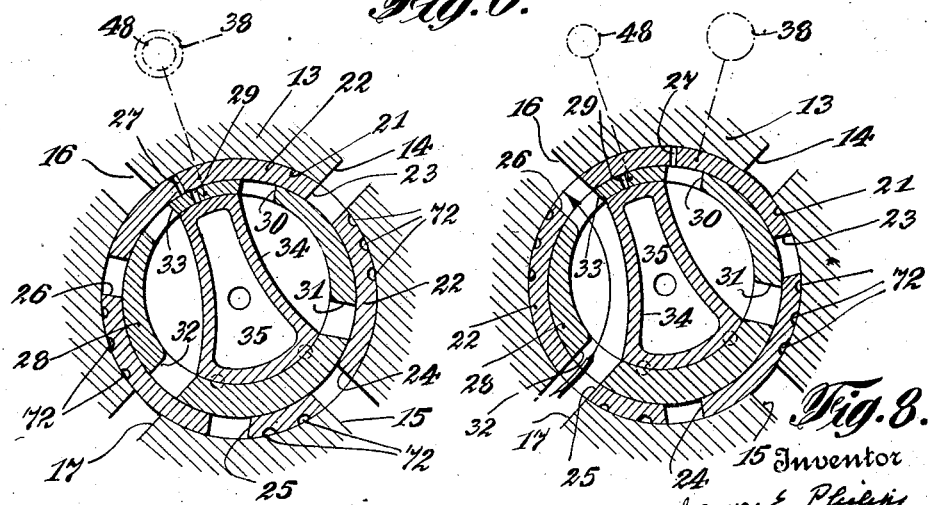
Fig. 7.
Fig. 8.
Inventor
James E. Philips
By his Attorney Patented Sept. 21, 1926.

1,600,644

UNITED STATES PATENT OFFICE.

JAMES E. PHILIPS, OF NEW YORK, N. Y.

VALVE MOVEMENT.

Application filed June 9, 1925. Serial No. 35,951.

My invention relates to valve movements and refers particularly to valve movements applicable for use in gas explosion engines and to devices pertaining thereto.

My invention is directed particularly to oscillating cylindrical valves which can be practically and efficiently employed in conjunction with engines operated by internal explosions, and which do away with puppet valves and the intricate and delicate mechanisms necessary in the employment of direct seating valves.

Because of the rapid movement and repeated impact force accompanying the use of direct seating valves, they are subjected to great wear, become loose and noisy, do not produce positive closure and are the cause of great loss of power and of injury to the engine itself.

Attempts to replace valves of the character last described by revolving sleeve valves, or longitudinally movable sleeve valves have not been generally successful because of the long and rapid movement of the valve parts necessary for the most satisfactory results, causing a wear upon the valve elements and a breaking down of the movement-causing elements.

The device of my invention overcomes all of the above mentioned, and other objectionable features of valve movements, and presents an oscillating cylindrical valve, in which the relative movements of the cylindrical elements are annularly oscillating and of a minimum of distance movement.

In the device of my invention, a plurality of cylindrical elements, having properly positioned ports, oscillate in unison or in opposition to each other, thus causing but a slight movement of any particular valve element. This results in a minimum of wear upon the moving ports, allows of rapid opening and closing of ports with a minimum of movement and produces a positive, non-leaking valve of the highest efficiency.

In my device, I employ a plurality of cylindrical valve members, preferably two, each having a plurality of ports, preferably four, oscillatable within and upon each other and within and upon a ported enclosure in the engine head, the several elements being so arranged and positioned that only a very slight oscillating movement is necessary in order to open and close the desired ports for the production of the required engine operation.

The elements and advantages of my invention will be evident upon a consideration of the accompanying drawings which illustrate one embodiment of my device, and which is given simply as a means for explaining my invention and its possible adaptation to an internal explosion engine.

In the accompanying drawings, illustrating one form of the device of my invention, similar parts are designated by similar numerals.

Figure 1 is a side view of a combustion engine embodying the device of my invention, partly broken away for purposes of clearness of description.

Figure 2 is an end view of Figure 1.

Figure 3 is an end view of the cam movable members with cams removed for purposes of clearer disclosure.

Figure 4 is a cross-section through the line 4—4 of Figure 6.

Figure 5 is a cross-section through the line 5—5 of Figure 4.

Figure 6 is a cross-section through the line 6—6 of Figure 4.

Figure 7 is a vertical cross-section illustrating the position of the valves when the engine is in compression position.

Figure 8 is a vertical cross-section illustrating the position of the valves when the engine is in exhaust position.

The particular form of the device of my invention shown in the accompanying drawings comprises a combustion engine body 10, having a combustion chamber 11, and a plurality of connected water cooling chambers 12, 12, 12. Fixedly attached to the body 10 is a head 13, having the ports, or openings, 14 and 15 for the entrance of explosive gases, the ports or openings, 16 and 17 for the exit of exhaust gases and a passageway 18 for the spark plug 19. The head 13 also contains a series of connected water cooling chambers 20, 20. The head has a horizontal cylindrical bore 21, connected with the ports 14, 15, 16 and 17.

Within the bore 21, abutting upon the inner face thereof and revoluble therein, is an outer hollow cylindrical valve member 22, having the ports or openings 23, 24, 25 and 26. I prefer to have this outer cylindrical valve member 22 in the form of a split cylinder 27, in order that compensation may be made for the expansion due to the heat of process. Within the outer valve member 22, abutting upon the inner face thereof and oscillatable therein is an inner hollow cylindrical valve member 28, split at 29 and having the ports, or openings, 30, 31, 32 and 33. Within the inner valve member 28, and fixedly attached thereto is a bracing or supporting member 34 having the water cooling conduit 35.

The outer and the inner valve members 22 and 28 carry packing rings 36, 36, 36.

For purposes of rigidity and better wearing properties I prefer to make the lower portion of the inner valve member 28, that is the portion against which the explosion impact is exerted, somewhat thicker than the other portions thereof.

The mechanism for oscillating the two cylindrical valve members 22 and 28 is as follows:—

The sleeve 37 is integral with the outer valve member 22, is fixedly attached to the arm 38, which is pivotally attached to the link 39 at 40, the link 39 being pivotally attached to the arm 41 at 42, the arm 41 being pivotally attached to the head 13 at 43. The arm 41 carries a roller 44 which runs within a cam groove 45 of a cam 46.

The sleeve 47, integral with the inner valve member 28, is fixedly attached at the arm 48, which is pivotally attached to the link 49 at 50, the link 49 being pivotally attached to the arm 51 at 52, the arm 51 being pivotally attached to the head 13 at 53. The arm 51 carries a roller 54 which runs within a cam groove 55 of a cam 56.

The two cams 46 and 56 are fixedly attached to the shaft 57 carried by the supporting arm 58. The cam shaft 57 carries the helical gear 59 meshing with the helical gear 60 of the shaft 61, the other helical gear 62 of which meshes with the helical gear 63 of the power shaft 64.

The revolution of the power shaft 64, therefore, revolves the cam shaft 57 thus oscillating the arm-link systems and oscillating the two cylindrical valve members 22 and 28.

The relation of these inter-operative oscillating elements is such as to produce the following movements in the several elements.

Figure 6 shows the device in position for gas intake, the relative positions of the ends of the arms 38 and 48 being indicated, graphically, by dot-and-dash lines. The exit port 17 is closed and the explosive gas is drawn into the explosion chamber 11 through the ports 14, 23, 30, 31 and 24 in the direction of the arrow.

Figure 7 shows the device in the next position, that is the compression or explosion phase, in which both the ports 17 and 15 are closed, the arms 38 and 48 having been moved by the cams to the position indicated.

Figure 8 shows the device in the exhaust position, with the port 15 closed and the exhaust gases escaping in the direction of the arrow through the ports 17, 25, 32, 33, 26 and 16. The arms 38 and 48 having taken the positions indicated.

The arms then return to the positions indicated in Figure 6 for a repetition of the steps of operation.

A consideration of the movements shown in Figures 6, 7 and 8, which covers a full cycle of power movement, shows that in order to pass from intake position to compression position the arm 38 remains stationary and the arm 48 moves the short distance from its first position to agreement with the arm 38. To pass from compression position to exhaust position, the arm 48 remains stationary and the arm 38 moves the short distance to the position formerly occupied by the arm 48, and to pass from exhaust position to intake position, the two arms 38 and 48 move the short distance to reverse position.

It is to be particularly noted, therefore, that the distance of movement of the arms 38 and 48 is very short, thus allowing of effective opening and closing of the several conduits necessary in operation by means of short element movements thus increasing the efficiency of the device and reducing the absorption of power for operation to a minimum. It also reduces the throw of the parts, thus preventing excessive wear and tear upon the moving parts.

For purposes of water cooling the head, water is introduced through the intake opening 65 and escapes through the outlet opening 66 after having passed through the chambers 20, 20, 20 and 35, as indicated.

The means adopted for internally cooling the member 34, which might otherwise become overheated during the exhaust period, is shown particularly in Figure 5, in which a pipe 67 is threaded to the member 34 and revolves therewith. In order to form a supporting and water tight joint between the revoluble pipe 67 and the stationary pipe 68, I employ the jointure members 69 and 70 threaded in attachment and carrying the revoluble ball 71, through which the pipe 67 passes and to which it is fixedly attached. The water enters in the direction of the arrow and passes through the pipes 67 and 68, the latter entering the general cooling system near the exit 66.

Proper means may be employed for lubrication of the moving parts.

Carbon receiving receptacles 72, 72, 72 may be recessed within the outer face of the valve member 22 if desired.

For simplicity of description, I have shown my device as applied to a single cylinder, but it is to be understood that it is applicable to a plurality of cylinders.

In order to avoid confusion, I have not specifically described those elements shown in the accompanying drawings which are self-evident mediums of construction, or are generally incident to devices of a similar character or are not a part of my invention.

I do not limit myself to the particular size, shape, number or arrangements of parts as shown and described as these are given simply as a means for clearly explaining my invention.

What I claim is:—

1. In an internal combustion engine having an inlet port and an outlet port, in combination, an exterior hollow cylindrical valve member having ports therein, the oscillation of which member will open and close the engine ports, an interior cylindrical valve member, the oscillation of which will open and close the ports of the external valve member and means for imparting an oscillating movement to the valve members whereby gas will consecutively pass into the engine, be retained under compression for ignition and pass outwardly of the engine, the valve members being stationary during compression and ignition.

2. In an internal combustion engine having an inlet port and an outlet port, in combination, an exterior hollow cylindrical valve member having ports therein, the oscillation of which member will open and close the engine ports, an interior cylindrical valve member, the oscillation of which will open and close the ports of the external valve member and means for imparting an oscillating movement of less than 90° to the valve members whereby gas will consecutively pass into the engine, be retained under compression for ignition and pass outwardly of the engine and means for water cooling the interior of the interior valve member.

3. In a valve movement, in combination, an engine head having a bore therein connected with inlet and outlet ports, an exterior oscillatable hollow cylindrical valve member having ports and abutting upon the inner face of the bore, an interior oscillatable hollow cylindrical valve member having ports and abutting upon the inner face of the exterior member, the ports being capable of placement in positions to allow of the inward passage of gas therethrough, the compression of said gas within the engine and the exit of exhaust gases therefrom and means for oscillating the valve members, the valve members being stationary during compression and ignition.

4. In a valve movement, in combination, an engine head having a bore therein connected with inlet and outlet ports, an exterior oscillatable hollow cylindrical valve member having ports and abutting upon the inner face of the bore, an exterior oscillatable hollow cylindrical valve member having ports and abutting upon the inner face of the exterior member, the ports being capable of placement in positions to allow of the inward passage of gas therethrough, the compression of said gas within the engine and the exit of exhaust gases therefrom by an oscillating movement of less than 90°, means for oscillating the valve members and means for cooling the inner face of the interior valve member.

5. In a valve movement, in combination, an engine head having a bore therein connected with inlet and outlet ports, a split exterior oscillatable hollow cylindrical valve member having four ports and abutting upon the inner face of the bore, a split interior oscillatable hollow cylindrical valve member having four ports and abutting upon the inner face of the exterior member, the ports being so positioned that an oscillation of the valve members of less than 90° will open and close the ports for the passage of gas therethrough and cam means whereby the revolution of a power shaft generated by gas explosions within the engine will oscillate the valve members opening and closing the ports.

6. In a valve movement, in combination, an engine head having a bore therein connected with inlet and outlet ports, a split exterior oscillatable hollow cylindrical valve member having four ports and abutting upon the inner face of the bore, a split interior oscillatable hollow cylindrical valve member having four ports within the interior member and abutting upon the inner face thereof, means whereby the oscillatable movement of one valve member of less than 90° will move the device from gas intake position to compression position, means whereby the oscillatable movement of the other valve member of less than 90° will move the device from compression position to exhaust gas exit position and means whereby the oscillation movement of both valve members of less than 90° each will move the device from exhaust position to gas intake position.

7. In a valve movement, in combination, an engine head having a bore therein connected with inlet and outlet ports, a split exterior oscillatable hollow cylindrical valve member having four ports and abutting upon the inner face of the bore, a split interior oscillatable hollow cylindrical valve member having four ports within the interior member and abutting upon the inner face thereof, cam means whereby the oscillatable movement of one valve member of less than 90° will move the device from gas intake position to compression position, cam means whereby the oscillatable movement of the other valve member of less than 90° will move the device from compression position to exhaust gas exit position, cam means whereby the oscillatable movement of both valve members of less than 90° each will move the device from exhaust position to gas intake position and water cooling means within the device.

8. In a valve movement, in combination, an engine head having a bore therein connected with inlet and outlet ports, a split exterior oscillatable hollow cylindrical valve member having four ports and abutting upon the inner face of the bore, a split interior oscillatable hollow cylindrical valve member having four ports within the interior member and abutting upon the inner face thereof, cam means whereby the oscillatable movement of one valve member of less than 90° will move the device from gas intake position to compression position, cam means whereby the oscillatable movement of the other valve member of less than 90° will move the device from compression position to exhaust gas exit position, cam means whereby the oscillatable movement of both valve members of less than 90° each will move the device from exhaust position to gas intake position, said cam means being operated by the revolution of a power shaft caused by explosions within the engine.

9. In a valve movement, in combination, an engine head having a bore therein connected with inlet and outlet ports, a split exterior oscillatable hollow cylindrical valve member having four ports and abutting upon the inner face of the bore, a split interior oscillatable hollow cylindrical valve member having four ports within the interior member and abutting upon the inner face thereof, cam means whereby the oscillatable movement of one valve member of less than 90° will move the device from gas intake position to compression position, cam means whereby the oscillatable movement of the other valve member of less than 90° will move the device from compression position to exhaust gas exit position, cam means whereby the oscillatable movement of both valve members of less than 90° each will move the device from exhaust position to gas intake position said cam means being operated by the revolution of a power shaft caused by explosions within the engine, means for water cooling the interior of the interior valve member and carbon collecting receptacles between the face of the bore and the exterior valve member.

10. In an internal combustion engine having an inlet port and an outlet port, in combination, an exterior hollow cylindrical valve member having ports therein non-equidistant from each other, the oscillation of which member will open and close the engine ports, an interior cylindrical valve member, the oscillation of which will open and close the ports of the external valve member and means for imparting an oscillating movement to the valve members whereby gas will consecutively pass into the engine, be retained under compression for ignition and pass outwardly of the engine, the valve members being stationary during compression and ignition.

11. In an internal combustion engine having an inlet port and an outlet port, in combination, an exterior hollow cylindrical valve member having ports therein non-equidistant from each other, the oscillation of which member will open and close the engine ports, an interior cylindrical valve member, the oscillation of which will open and close the ports of the external valve member and means for imparting an oscillating movement of less than 90° to the valve members whereby gas will consecutively pass into the engine, be retained under compression for ignition and pass outwardly of the engine and means for water cooling the interior of the interior valve member.

12. In a valve movement, in combination, an engine head having a bore therein connected with inlet and outlet ports, an exterior oscillatable hollow cylindrical valve member having ports non-equidistant from each other and abutting upon the inner face of the bore, an interior oscillatable hollow cylindrical valve member having ports and abutting upon the inner face of the exterior member, the ports being capable of placement in position to allow of the inward passage of gas therethrough, the compression of said gas within the engine and the exit of exhaust gases therefrom and means for oscillating the valve members, the valve members being stationary during compression and ignition.

13. In a valve movement, in combination, an engine head having a bore therein connected with inlet and outlet ports, an exterior oscillatable hollow cylindrical valve member having ports non-equidistant from each other and abutting upon the inner face of the bore, an interior oscillatable hollow cylindrical valve member having ports and abutting upon the inner face of the exterior member, the ports being capable of placement in positions to allow of the inward passage of gas therethrough, the compression of said gas within the engine and the exit of exhaust gases therefrom by an oscillating movement of less than 90°, means for oscillating the inner face of the interior valve member.

Signed at New York city, in the county of New York and State of New York, this 4th day of June, 1925.

JAMES E. PHILIPS.